US005951088A

United States Patent [19]
Schoen et al.

[11] Patent Number: 5,951,088

[45] Date of Patent: Sep. 14, 1999

[54] DECK LID CONTROL BALANCE AND LIFT ASSIST

[75] Inventors: Robert M. Schoen, West Bloomfield, Mich.; Bob Barkley, Nepean, Canada

[73] Assignee: Chrysler Corporation, Auburn Hills, Mich.

[21] Appl. No.: 08/944,815

[22] Filed: Oct. 6, 1997

Related U.S. Application Data

[63] Continuation-in-part of application No. 08/549,412, Oct. 27, 1995, Pat. No. 5,746,468.

[51] Int. Cl.[6] .................... B62D 25/10

[52] U.S. Cl. .................... 296/76; 267/154

[58] Field of Search .................... 296/76; 267/154

[56] References Cited

U.S. PATENT DOCUMENTS

| | | | |
|---|---|---|---|
| 2,594,643 | 4/1952 | Gustisha | 296/76 |
| 3,476,375 | 11/1969 | Brasseur | 296/76 |
| 3,695,678 | 10/1972 | Gergoe | 296/76 |
| 5,746,468 | 5/1998 | Schoen et al. | 296/76 |

*Primary Examiner*—Gary C. Hoge
*Attorney, Agent, or Firm*—Jennifer M. Stec

[57] ABSTRACT

A mechanism for assisting the movement of a deck lid of a vehicle includes a transverse torsion bar centrally formed with a central segment oriented perpendicularly to the transverse dimension. A connecting link is pivotably engaged with the central segment and with the deck lid, to establish, along with the central segment, an articulating link interconnecting the torsion and the deck lid. The torsion bar includes left and right torsion elements that are mirror images of each other, with each torsion element including a respective outboard segment that is affixed to the body of the vehicle.

19 Claims, 1 Drawing Sheet

DECK LID CONTROL BALANCE AND LIFT ASSIST

RELATED APPLICATIONS

This application is a continuation-in-part of, and claims priority from, U.S. patent application Ser. No. 08/549,412, filed Oct. 27, 1995, now U.S. Pat. No. 5,746,468, for an invention entitled "TORSION BAR ASSIST WITH RATCHET HOLD MECHANISM FOR AUTOMOBILE DECK LIDS", having at least one inventor in common with the present invention, owned by the present assignee and incorporated herein by reference.

FIELD OF INVENTION

The present invention relates generally to automobiles, and more particularly to mechanisms for lifting the rear deck lid of an automobile.

BACKGROUND OF THE INVENTION

Torsion bars have been provided for assisting in raising rear trunk covers, referred to herein as "deck lids", to expose the trunk space of the vehicles with which the deck lids are associated. Typically, a torsion bar is oriented transversely in the trunk of the vehicle with which it is associated, with an end of the torsion bar being affixed to the body of the vehicle and with the torsion bar being configured so as to cause it to urge upwardly against the deck lid hinge and thus the deck lid.

The above-referenced parent application to this application recognizes that, while effective in urging deck lids upwardly, some torsion bar lift assist systems do not facilitate maintaining a deck lid at intermediate positions between the fully closed and fully open positions when, for instance, the person lifting the deck lid releases the lid inadvertently, or when the person deliberately releases the lid to improve his or her purchase on the lid. Accordingly, a purpose of the invention disclosed in the parent application was to provide a deck lid lift assist system which temporarily holds a deck lid of a vehicle in a position between its fully open and fully closed positions when a person releases the deck lid.

The present invention recognizes a different problem, namely, that torsion bars used to assist the raising of deck lids that open to an almost vertical orientation from an almost horizontal closed position can provide insufficient upward force on the deck lid as the deck lid approaches the fully open (i.e., vertical) position. This is because such deck lids move through a relatively wide range of travel between the closed and open positions. Furthermore, the present invention recognizes that it is desirable to easily tailor the opening force provided by a deck lid torsion bar for the particular vehicle model.

Accordingly, it is an object of the present invention to provide a deck lid lift assist system that can urge a deck lid upwardly through a comparatively wide range of travel. Another object of the present invention is to provide a deck lid lift assist system which urges a deck lid of a vehicle toward an open position. Yet another object of the present invention is to provide a deck lid lift assist system that is easy to use and cost-effective to manufacture.

SUMMARY OF THE INVENTION

A mechanism is engageable with a deck lid of a vehicle having a body for assisting movement of the deck lid relative to the body. The present mechanism includes a torsion bar that defines left and right opposed outboard segments, and at least one outboard segment is connectable to the body with the torsion bar oriented generally transversely relative to the vehicle. Moreover, the torsion bar includes a central segment oriented perpendicularly to a transverse dimension defined by the vehicle. The central segment defines a connection end to which a connecting link is pivotably attached. Also, the connecting link is connectable to the deck lid to translate motion of the torsion bar to the deck lid. As provided for by the present invention, the length of the connecting link, and the point of its attachment to the deck lid, are established to "tune" the torque assist force magnitude provided by the mechanism.

In a preferred embodiment, the deck lid is hingedly engaged with the body for movement between an open position and a closed position, and the torsion bar urges the deck lid toward the open position when the mechanism is engaged with the vehicle. Additionally, the torsion bar preferably includes left and right bar elements, with each bar element including a respective inboard connecting segment. Per the present invention, the inboard connecting segments together establish the central segment of the torsion bar.

As set forth in detail below, when the deck lid is in the closed position, the deck lid defines an outer generally horizontal surface and an inside generally horizontal surface, and the connecting link is pivotably engageable with the inside horizontal surface of the deck lid. If desired, plural radial support bushings can be operatively engaged with the torsion bar to support the bar.

To connect the connecting link to the deck lid, a mounting bracket is attachable to the deck lid and pivotably engaged with the connecting link. On the other hand, to pivotably engage the connecting link with the central segment, a pivot pin connects the central segment and the connecting link. The mechanism is also is disclosed in combination with the vehicle.

In another aspect, in a vehicle deck lid hingedly engaged with a body of the vehicle, a deck lid lift assist system includes a torsion bar connected to the body and materially biased for urging the deck lid upwardly. Also, the system includes an articulating link interconnecting the torsion bar and the deck lid.

In yet another aspect, a method is disclosed for movably coupling a deck lid to a body of a vehicle such that the deck lid is movable between an open position and a closed position. In accordance with the present invention, the method includes associating a connecting link with the deck lid, and pivotably engaging a central segment of a torsion bar with the connecting link. The method further includes engaging the torsion bar with the body to urge the deck lid toward the open position.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
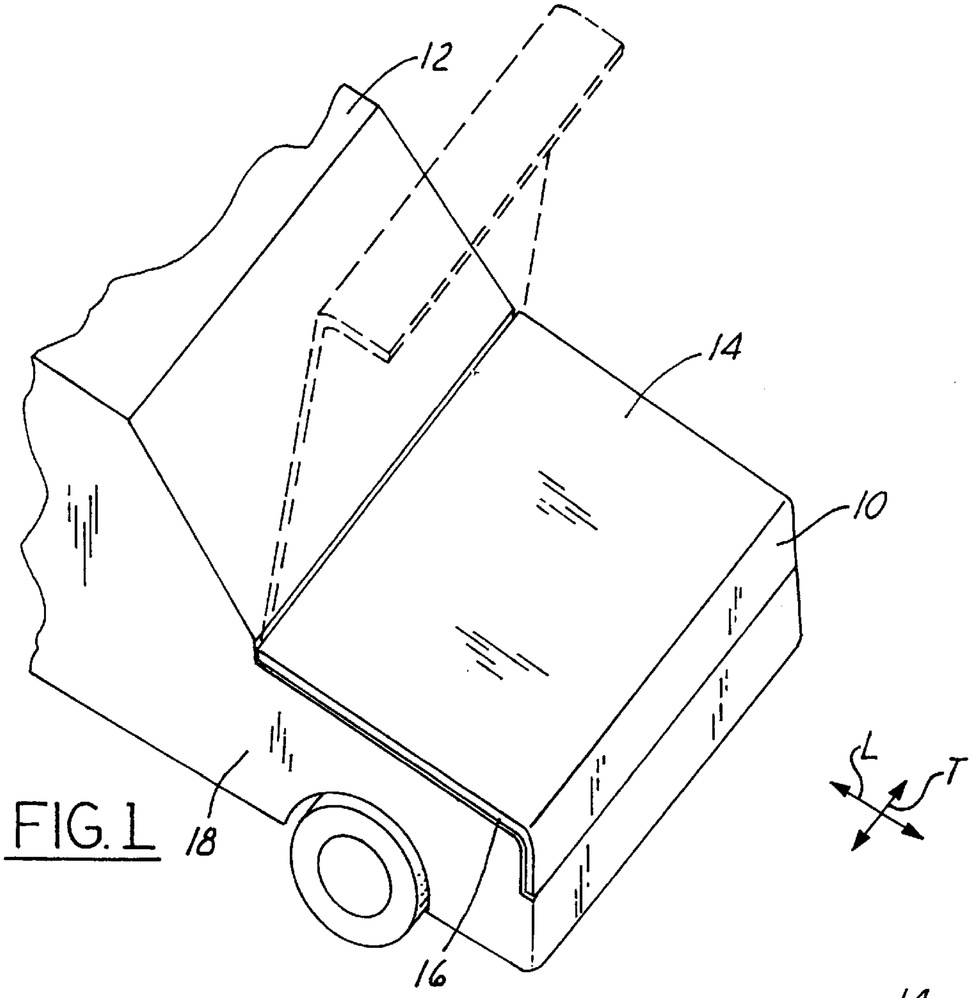
FIG. 1 is a perspective view of a deck lid in a closed position on a vehicle, with portions of the vehicle broken away, with the deck lid in the open position shown in phantom.

Referring initially to FIG. 1, a deck lid 10 is shown in a closed position to cover a trunk space of a vehicle 12. In the closed position shown, the deck lid 10 defines an outer horizontal top surface 14 and an inner horizontal bottom surface 16, only the edge of which bottom surface 16 can be seen in FIG. 1. Per the present invention, the vehicle 12 defines a longitudinal dimension, indicated by the double arrow "L", and a transverse dimension, indicated by the double arrow "T". As used below, terms of direction are referenced to the longitudinal dimension "L" and the transverse dimension "T" defined by the vehicle 12.

It is to be understood that the deck lid 10 is hingedly engaged with the body 18 of the vehicle 12 by means well-known in the art for movement between the closed position shown in solid in FIG. 1 and an open position, shown in phantom in FIG. 1. More particularly, left and right conventional automotive trunk hinges are fixedly attached to the deck lid 10 and pivotably connected to the body 18 in accordance with well-known principles, to thereby hingedly engage the deck lid 10 with the body 18. As disclosed in detail below, it is the purpose of the present invention to assist a person in raising the deck lid 10 from its closed position shown in solid FIG. 1, in which the deck lid 10 is oriented substantially horizontally, to the open position shown in phantom in FIG. 1, in which the deck lid 10 is oriented substantially vertically.

Figure 2:
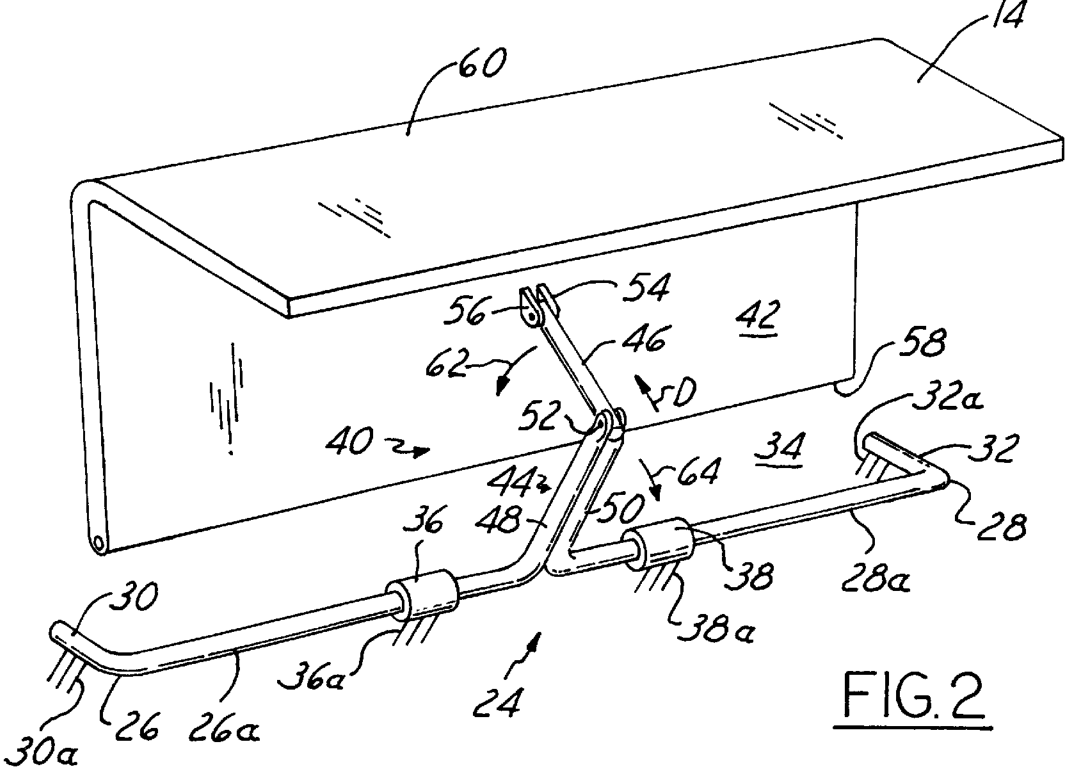
FIG. 2 is a perspective view of the deck lid in an open position in operative combination with the deck lid assist system of the present invention, with the connections between the torsion bars, bar bushings, and vehicle body shown schematically.

With particular reference to FIG. 2, an elongated, solid metal, cylindrically-shaped torsion bar, generally designated 24, preferably includes left and right torsion elements 26, 28 which are generally transversely oriented and which are mirror images of each other. As shown, each torsion element 26, 28 includes a respective longitudinally oriented outboard segment 30, 32. At least one, and in the preferred embodiment shown both, of the outboard segments 30, 32 are affixed to a respective side of the body 18 within a trunk space 34. The outboard segments 30, 32 of the torsion elements 26, 28 are affixed to the body 18 at schematically-shown connection points 30*a*, 32*a* by means well-known in the art, e.g., by bolting or clamping the segments 30, 32 to the body 18, or by keying the segments 30, 32 to respective keyways (not shown) that are formed in the body 18. Moreover, transversely-oriented segments 26*a*, 28*a* of the segments 26, 28 are colinear with each other.

As shown in FIG. 2, the torsion elements 26, 28 are radially supported by at least two support bushings 36, 38. As intended herein, the bushings 36, 38 are suitable automotive bushings that are connected to the body 18 at schematically-shown connection points 36*a*, 38*a* and engaged with the torsion elements 26, 28 as appropriate to rotatably support the elements 26, 28.

In accordance with the present invention, an articulating link, generally designated 40, interconnects an inside surface 42 of the deck lid 14 with the torsion bar 24. In the preferred embodiment shown, the articulating link 40 is established by a transversely central segment, generally designated 44, of the torsion bar 24 and by a connecting link 46 that is pivotably coupled to both the central segment 44 and the deck lid 14. As can be readily appreciated looking at FIG. 2, the central segment 44 is established by parallel inboard connecting segments 48, 50 of the torsion elements 26, 28, with the connecting segments 48, 50 being perpendicular to the transversely-oriented segments 26*a*, 28*a*. Stated differently, the central segment 44 is perpendicular to the transverse dimension T of the vehicle 12. Preferably, each torsion element 26, 28 is formed from a unitary piece of steel rod.

With particular regard to the connection between the connecting link 46 and the central segment 44, a pivot pin 52 extends through the connecting link 44 and the center segments 48, 50, with the connecting link 44 and/or segments 48, 50 being rotatable about the pin 52. On the other hand, the connecting link 46 is rotatably engaged with a two-armed bracket 54 that is in turn welded or bolted to the deck lid 14, to thereby pivotably engage the connecting link 46 with the deck lid 14. A pin 56 extends through the bracket 54 and link 46 to hold the components together in the rotatable relationship described. Preferably, the bracket 54 is closer to a front edge 58 of the deck lid 14 than to a rear edge 60 of the deck lid 14, it being understood that the deck lid 14 is hingedly connected to the vehicle 12 substantially about the front edge 58.

As provided for by the present invention, the length "D" of the connecting link 46 between the pivot pin 52 and the bracket 54 is established as appropriate to render a desired torque assist force magnitude. Furthermore, as intended by the present invention, the torsion bar 24 is affixed to the body 18 with torque pre-loaded into the torsion bar 24, such that the maximum torque pre-loading is present when the deck lid 14 is in the closed position. Furthermore, the moment arm exerted by the torsion bar 24 against the deck lid 14 decreases as the deck lid 14 moves from the closed position toward the open position.

Consequently, when it is desired to move the deck lid 14 toward the open position, the torque assist to such movement imparted by the torsion bar 24 is greater when the person's mechanical advantage in opening the deck lid 14 is at a minimum (i.e., when the deck lid 14 is near the closed position). On the other hand, the torque assist to such movement imparted by the torsion bar 24 is less when the person's mechanical advantage in opening the deck lid 14 is at a maximum (i.e., when the deck lid 14 is near the open position).

Accordingly, the operation of the deck lid assist system can now be appreciated. The deck lid 14 can be raised from the closed position shown in FIG. 1 to the open position shown in phantom FIG. 1 by a person. As the deck lid 14 is being raised, the central segment 44 of the torsion bar 24, owing to the torque preloading, urges upwardly toward the connecting link 46. In turn, the link 46 urges the deck lid 14 toward the open position. As the deck lid 14 moves, the connecting link 46 pivots generally upwardly (i.e., from a somewhat horizontal orientation to a more vertical orientation), relative to the central segment 44, and the link 46 rotates in the bracket 54 as appropriate during this movement. This motion is opposite that indicated by the arrow 62. At the same time, the deck lid 14 pivots upwardly (i.e., from a somewhat horizontal orientation to a more vertical orientation) opposite the direction indicated by the arrow 64.

When it is desired to move the deck lid 14 to the closed position, the person urges downwardly on the lid 14, and the connecting link 46 and central segment 44 respectively pivot in the directions indicated by the arrows 62, 64. In essence, the articulating link 40 of the present collapses when the deck lid 14 is closed, and extends when the deck lid 14 is opened.

While the particular TORSION BAR ASSIST WITH ARTICULATING LINK FOR AUTOMOBILE DECK LIDS as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A mechanism engageable with a deck lid of a vehicle having a body for assisting movement of the deck lid relative to the body, comprising:

a torsion bar defining left and right opposed outboard segments, at least one outboard segment being connectable to the body with the torsion bar oriented generally transversely relative to the vehicle, the torsion bar including a central segment oriented perpendicularly to a transverse dimension defined by the vehicle, the central segment defining a connection end; and a connecting link pivotably attached to the connection end of the central segment and connectable to the deck lid to translate motion of the torsion bar to the deck lid.

2. The mechanism of claim 1, wherein the deck lid is hingedly engaged with the body for movement between an open position and a closed position, and the torsion bar urges the deck lid toward the open position when the mechanism is engaged with the vehicle.

3. The mechanism of claim 2, wherein the torsion bar includes left and right bar elements, each bar element including a respective inboard connecting segment, the inboard connecting segments together establishing the central segment of the torsion bar.

4. The mechanism of claim 2, wherein when the deck lid is in the closed position, the deck lid defines an outer generally horizontal surface and an inside generally horizontal surface, and the connecting link is pivotably engageable with the inside horizontal surface of the deck lid.

5. The mechanism of claim 4, further comprising a plurality of radial support bushings operatively engaged with the torsion bar.

6. The mechanism of claim 2, further comprising a mounting bracket attachable to the deck lid and pivotably engaged with the connecting link.

7. The mechanism of claim 6, further comprising a pivot pin connecting the central segment and the connecting link.

8. In a vehicle deck lid hingedly engaged with a body of the vehicle, a deck lid lift assist system, comprising:

a torsion bar connected to the body and materially biased for urging the deck lid upwardly; and an articulating link interconnecting the torsion bar and the deck lid.

9. The system of claim 8, wherein the torsion bar includes:

left and right bar elements, each bar element including a respective outboard segment, at least one outboard segment being connected to the body with the torsion bar oriented generally transversely relative to the vehicle.

10. The system of claim 9, wherein the articulating link includes:

a central segment oriented perpendicularly to a transverse dimension defined by the vehicle, the central segment defining a connection end; and a connecting link pivotably attached to the connection end of the central segment and connected to the deck lid to translate motion of the torsion bar to the deck lid.

11. The system of claim 10, wherein each bar element includes a respective inboard connecting segment, the inboard connecting segments together establishing the central segment of the articulating link.

12. The system of claim 11, wherein when the deck lid is in the closed position, the deck lid defines an outer generally horizontal surface and an inside generally horizontal surface, and the connecting link is pivotably engageable with the inside horizontal surface of the deck lid.

13. The system of claim 12, further comprising a plurality of radial support bushings operatively engaged with the torsion bar.

14. The system of claim 13, further comprising a mounting bracket attached to the deck lid and pivotably engaged with the connecting link.

15. The system of claim 14, further comprising a pivot pin connecting the central segment and the connecting link.

16. The system of claim 15, in combination with the vehicle.

17. The mechanism of claim 1, in combination with the vehicle.

18. A method for movably coupling a deck lid to a body of a vehicle such that the deck lid is movable between an open position and a closed position, the method comprising the steps of:

associating a connecting link with the deck lid;

pivotably engaging a central segment of a torsion bar with the connecting link; and engaging the torsion bar with the body to urge the deck lid toward the open position.

19. The method of claim 18, further comprising the steps of:

establishing the torsion bar with two opposed torsion elements, each torsion element including a transverse segment, the transverse segments of the torsion elements being colinear with each other, each torsion element defining a respective center segment extending perpendicularly relative to the transverse dimension, the center segments together establishing the central segment of the torsion bar.

* * * * *